Patented Jan. 5, 1943

2,307,048

UNITED STATES PATENT OFFICE 2,307,048

PRODUCTION OF TiO₂ PIGMENTS

John Lewis Keats, Wilmington, Del., assignor to E. I. du Pont de Nemours & Company, Wilmington, Del., a corporation of Delaware No Drawing. Application September 15, 1939, Serial No. 295,049

11 Claims. (Cl. 23—202)

This invention relates to the production of improved titanium oxide pigments and more particularly to a novel method for improving the brightness and other pigmentary qualities of such substances.

More specifically, the invention relates to the production of titanium oxide pigments exhibiting improved brightness, color and tinting strength and possessing substantially the X-ray diffraction pattern of rutile.

On hydrolysis, titanium sulfate solutions yield a raw TiO₂ pigment product which possesses the X-ray diffraction pattern of anatase. On calcination, this raw pigment loses its volatile content (moisture and sulfuric acid and undergoes various changes, among others, growth of crystal size and change in particle size. Calcination is conducted under relatively controlled temperature conditions and in order to develop optimum pigment qualities, particularly tinting strength and color. If the temperature of calcination is sufficiently high, the anatase crystals will be converted more or less to rutile, which has a refractive index higher than anatase. However, the temperature which is required to effect such conversion is so high that a serious sacrifice occurs in pigment properties, particularly color and brightness. Also, an objectionable loss is had in tinting strength, due to excessive growth of particle size.

The addition of certain treating agents, particularly the salts of sodium and potassium, to raw pigment anatase prior to calcination to improve the quality of the final pigment, has already been suggested. However, potassium salts are relatively strong inhibitors of rutile formation. For instance, when the raw precipitate is calcined in the presence of such potassium salts and at temperatures of the order of substantially 1000° C., the anatase crystal form is retained. Sodium salts also act as effective inhibiting agents against rutile formation, though to a somewhat lesser extent. In either event, however, should the calcination temperature be increased to a point where rutile is formed (well above 1000° C.) the final pigment product will be found to be greyish in appearance, and its tinting strength will be objectionably reduced, due to objectionable growth of particle size. As a consequence, conversion of the anatase precipitate to rutile and production of a satisfactory, final rutile titanium oxide pigment is not attainable in such prior methods.

Quite unexpectedly and contrary to the experiences had when other types of alkali salts are used during calcination, I have found that if the raw pigment TiO₂ is subjected to calcination in the presence of lithium salts, especially relatively minor quantities thereof, an entirely different result is procured. I have found that lithium salts not only fail to inhibit rutile formation during calcination, but they usually actually catalyze the conversion from anatase. It is my further discovery that calcinations in the presence of lithium salts need only be conducted at relatively moderate temperatures to effect such conversion to rutile; and that thereby such conversion can be readily effected, in whole or in part, without any objectionable sacrifice in the pigment properties of the final product, particularly alteration of particle size and consequent reduction in tinting strength and hiding power, or sacrifice in color or brightness.

It is accordingly among the objects of this invention to provide a novel process for the preparation of titanium oxide pigments of superior brightness, color and high tinting strength. A further object is the preparation of titanium oxide pigments in the rutile crystalline form and through means of calcination at relatively moderate temperatures. A still further object is the preparation of titanium oxide pigments in the rutile crystalline form, characterized by high tinting strength and superior brightness and color.

These and other objects are accomplished in this invention which comprises subjecting precipitated anatase titanium oxide to calcination in the presence of a lithium salt as a rutile conversion accelerator.

In a more specific and preferred embodiment, the invention comprises subjecting precipitated raw anatase TiO₂ from the hydrolysis of a titanium sulfate solution to calcination at a relatively moderate temperature in the presence of a relatively small amount of a lithium salt adapted to catalyze the conversion of said anatase to rutile during such calcination.

In one practical and preferred adaptation of the invention, the product obtained from the hydrolysis of a titanium sulfate solution (such as the type of product resulting from the hydrolysis procedures described in U. S. Reissue Patent 18,854), after being suitably washed to displace the mother liquor, is intimately mixed, in any desired manner, with a relatively small amount, say, about 1%, calculated on the pigment basis, of a lithium compound, preferably an inorganic soluble salt, such as lithium sulfate. Admixture of the precipitate and salt can be conveniently effected by adding the desired quantity of treating agent, such as a 10% solution of Li₂SO₄.H₂O, to a relatively thick pulp or aqueous slurry of the raw pigment, agitation or stirring of the mixture being then had to effect intimate association of treating agent and raw pigment. Thereafter, the precipitate-lithium compound mixture is subjected to drying and calcination, said calcination being effected at temperatures in excess of substantially 800° C., and preferably within the range of from about 900 to 950° C., to develop optimum pigment qualities in the final product. The calciner discharge may be suitably treated, e. g., by washing to remove soluble salts, in accordance with conventional pigment processing methods. The final product comprises a high-quality pigment substance which, when tested in accordance with well-known X-ray methods, will be found to comprise titanium oxide in substantially the crystalline structure of rutile.

In order that the invention may be more clearly understood, the following specific examples are given, each being merely in illustration and not in limitation of the invention:

EXAMPLE I

Titanium sulfate solution prepared by attacking ilmenite with H₂SO₄ was hydrolyzed as follows: 3030 cc. of a solution containing 297 g. TiO₂, 42.0 g. Fe and 710 g. H₂SO₄ per liter was heated to 97° C., and was then run at a uniform rate during a period of 15¾ minutes into a vessel containing 1000 cc. of water held at 92° C. A turbidity appeared during the first few seconds of the mixing which later disappeared. After the addition of the titanium sulfate solution to the diluent was complete the diluted solution was raised to the boiling point of the solution (109° C.) and boiled for a period of 3 hours. The raw pigment precipitate was washed in the usual manner to remove iron and other impurities. The wet filter cake was divided into two parts, to one of which was added an amount of lithium sulfate, Li₂SO₄.H₂O, equivalent to 1% on the TiO₂ basis. The two portions were dried separately and calcined at temperatures of 950 and 1000° C. The samples which were calcined at 950° C. were of the anatase crystal form. The one which was treated with lithium sulfate was distinctly superior to the untreated product as regards both tinting strength and color. Of the products calcined at 1000° C. the one which was treated with lithium sulfate contained 75% rutile while the one not salt treated contained only 50% rutile. The lithium salt-treated product was graded 6 in color compared with −25 for the untreated product. The foregoing facts are summarized in the following table:

|  | 950° C. calcination | | | 1000° C. calcination | |
|---|---|---|---|---|---|
|  | Crystal form | Strength | Color | Crystal form | Color |
| No salt treatment | Anatase | 380 | 6 | 50% rutile | 6 |
| 1% Li₂SO₄.H₂O | do | 530 | 11 | 75% rutile | 11 |

EXAMPLE II

Titanium oxide raw pigment was prepared by hydrolysis of titanium sulfate solution as follows: 2030 cc. of a solution of titanium sulfate containing 294 grams TiO₂ and 71 grams Fe per liter was run into 200 cc. of water heated to 92° C. in a period of 14 minutes. The resulting solution was heated to boiling and boiled for a period of 3 hours at a concentration of 225 grams TiO₂ per liter. The precipitate from the hydrolysis was washed in the usual manner to remove iron and other impurities. The washed raw pigment was divided into two equal parts into one of which was incorporated lithium sulfate equivalent to 1% Li₂SO₄.H₂O on the TiO₂ basis. The products were dried at a temperature of 100° C. and the dried products calcined for a period of 30 minutes at a temperature of 950° C. The product containing lithium sulfate was all rutile after calcination and was characterized by a color of 13+ while the product not containing lithium sulfate was 50% rutile after calcination and was given a color grading of 4.

The color and brightness determinations herein referred to were obtained in accordance with the methods described by J. E. Booge and H. E. Eastlack in the Paint, Oil and Chemical Review, April 9, 1924.

To demonstrate more particularly the benefits which are derivable in the invention, especially as regards increase in rutile conversion and impartation of improved color and brightness to the final pigment product, the following table is given, showing the results of calcination of different raw pigments prepared under different hydrolysis conditions. Results are shown for each pigment, both with and without lithium salt treatment:

*Table I*

| Pigment | Salt treatment | Calcination temperature | Crystal form | Color (brightness) |
|---|---|---|---|---|
| 1 | None | 1000 | 50% rutile | −25. |
|   | 1% Li₂SO₄.H₂O | 1000 | 75% rutile | 6. |
| 2 | None | 1000 | 40% rutile | −15. |
|   | 1% Li₂SO₄.H₂O | 1000 | 50% rutile | 10. |
| 3 | None | 1000 | Anatase | 10. |
|   | 1% Li₂SO₄.H₂O | 1000 | 25% rutile | 13. |
| 4 | None | 1000 | 15% rutile | 8. |
|   | 1% Li₂SO₄.H₂O | 1000 | 50% rutile | 11. |
| 5 | None | 950 | 50% rutile | 4. |
|   | 1% Li₂SO₄ | 950 | All rutile | 13+. |
| 6 | None | 950 | Not det. | Very poor. |
|   | 1% Li₂SO₄ | 950 | All rutile | 8. |
| 7 | None | 950 | Not det. | Very poor. |
|   | 1% Li₂SO₄ | 950 | All rutile | 9. |

As will be evident, in each instance the lithium salt-treated TiO₂ showed a decided improvement in brightness and increase in rutile content over the untreated control sample.

By employing larger quantities of lithium salts during the calcination treatment, it will be found that rutile formation becomes desirably increased, as is evident from the data in the ensuing table, also based on the treatment of an anatase precipitate from a titanium sulfate hydrolysis:

*Table II*

| Pigment | Salt treatment | Calcination temperature | Crystal form |
|---|---|---|---|
|   |   | Degrees |   |
| a | None | 850 | Anatase. |
|   | 10% Li₂SO₄ | 850 | Rutile. |
| b | None | 950 | Anatase. |
|   | 10% Li₂SO₄ | 950 | Rutile. |
| c | None | 850 | Anatase. |
|   | 10% LiCl.2H₂O | 850 | Rutile. |
|   | 10% LiF | 850 | Do. |
| d | None | 950 | Anatase. |
|   | 10% LiCl.2H₂O | 950 | Rutil. |
|   | 10% LiF | 950 | Do. |
|   | 10% Li₂CO₃ | 950 | Do. |

As will be apparent from the data given above, different salts of lithium are effective in lowering the conversion temperature of the anatase to rutile and for imparting the desired requisite brightness and color characteristics to the final product. Although mentioned salts comprise those preferred for use, all types of lithium compounds may be used herein, particularly the inorganic soluble salts, especially the sulfate, halide, chlorate, carbonate, nitrate, etc., alone or in admixture with other lithium salts or with other alkali metals such as, for instance, in the commonly occurring minerals which contain lithium. While the soluble lithium salts are especially preferred, those which are relatively insoluble in character may also be employed.

Again, while reference has been made and use had of specific amounts of treating agents, the invention is not limited to such amounts. In general, use is contemplated of amounts of lithium compounds ranging from substantially 0.2% to 10% or higher. In most instances the addition of about 1.0% of lithium salt calculated on the pigment basis, will be found sufficient to cause an appreciable lowering of the temperature of conversion and as an effective quantity for improving the tinting strength and brightness even at calcination temperatures well below those ordinarily required for effecting such conversion.

Also, though calcination temperatures in excess of 800° C., and specifically of the order of 850° to 1000° C., have been shown to be utilizable, even higher temperatures may be employed, and always with improved quality of product over that obtained by calcination at the same temperature of a pigment which is the same except that no lithium salt is present.

As has been indicated, by the use of lithium salts in accordance with the invention it will be found that they not only assist in effecting formation of rutile, but actually catalyze the conversion. Furthermore, while heretofore temperatures greatly in excess of 1000° C. have been required to effect such conversion, in the instant invention the calcination temperature required to develop optimum pigment properties is considerably reduced. An important factor in the invention resides in the discovery that at these relatively moderate (900–1000° C.) calcination temperatures the lithium-treated product becomes converted wholly or in major amount to rutile and without objectionable alteration of particle size or appreciable sacrifice in color. As a result, a rutile type titanium oxide pigment is produced which exhibits much higher tinting strength and hiding power than those of the anatase type, and due to the direct relationship between these pigment properties and refractive index.

The invention embodies the discovery therefore that lithium salt treatment of titanium oxide pigment filter cake is specific in permitting calcinations at a temperature high enough to obtain conversion from anatase to rutile without at the same time encountering (1) objectionable sintering with its detrimental effect on particle size, and (2) serious loss of color. It also embodies the discovery that lithium salt treatment of titanium oxide raw pigment, followed by calcination at temperatures lower than are required for conversion from anatase to rutile, yields rutile products of improved strength and color. Thus, the treatment of the raw pigment from a sulfate hydrolysis with lithium salts to increase the rutile content and improve the brightness of the calcined products is distinctly an improvement over prior procedures, and especially those contemplating the use only of such alkali salts as those of sodium and potassium. Not only are lithium salts effective in promoting rutile formation, but at the same time they improve the brightness and color of the final product.

I claim as my invention:

1. A process for producing a titanium oxide pigment exhibiting substantially the X-ray diffraction pattern of rutile, comprising subjecting a washed TiO₂ hydrolysis precipitate to calcination in the presence of a small amount of an added lithium salt.

2. A process for producing a titanium oxide pigment exhibiting substantially the X-ray diffraction pattern of rutile, comprising subjecting the washed precipitate obtained from the hydrolysis of a titanium sulfate solution to calcination in the presence of a small amount of a lithium salt added to said precipitate.

3. A process for producing a titanium oxide pigment exhibiting substantially the X-ray diffraction pattern of rutile, comprising subjecting washed precipitated anatase titanium oxide to calcination in the presence of from about 0.2% to about 10%, on the pigment basis, of a lithium salt added to said precipitate.

4. A process for producing a titanium oxide pigment exhibiting substantially the X-ray diffraction pattern of rutile, comprising subjecting washed precipitated anatase titanium oxide to calcination in the presence of from 1% to 10%, on the pigment basis, of a lithium salt added to said precipitate.

5. A process for producing rutile titanium oxide pigment comprising calcining washed precipitated anatase titanium oxide in the presence of added lithium sulfate.

6. A process for producing rutile titanium oxide pigment comprising calcining washed precipitated anatase titanium oxide in the presence of from about 1 to 10% of added lithium sulfate.

7. A process for producing rutile titanium oxide pigment comprising calcining washed precipitated anatase titanium oxide in the presence of about 1% of added Li₂SO₄·H₂O.

8. A process for producing rutile titanium oxide pigment comprising calcining washed precipitated anatase titanium oxide in the presence of added lithium chloride.

9. A process for producing rutile titanium oxide pigment of improved brightness and color and through conversion of precipitated washed anatase titanium oxide, comprising subjecting said anatase modification to calcination at temperatures ranging from substantially 800 to 1000° C., in the presence of a small amount of a soluble salt of lithium added to said anatase titanium oxide.

10. A process for producing rutile titanium oxide pigment of improved brightness and color and through conversion of anatase titanium oxide, comprising subjecting said anatase modification to calcination at temperatures ranging from substantially 800 to 1000° C., in the presence of from .02 to 10% of added lithium sulfate.

11. A process for producing rutile titanium oxide pigment of improved brightness and color and through conversion of precipitated, washed anatase titanium oxide, comprising subjecting said anatase modification to calcination at temperatures ranging from substantially 850 to 1000° C., in the presence of from about 1 to 10% of an added inorganic soluble salt of lithium.

JOHN LEWIS KEATS.

CERTIFICATE OF CORRECTION.

Patent No. 2,307,048.  January 5, 1943.

JOHN LEWIS KEATS.

It is hereby certified that error appears in the printed specification of the above numbered patent requiring correction as follows: Page 2, second column, line 10, for "periof" read --period--; page 3, second column, line 61, claim 10, before the word "anatase" insert --precipitated, washed--; and that the said Letters Patent should be read with this correction therein that the same may conform to the record of the case in the Patent Office.

Signed and sealed this 2nd day of March, A. D. 1943.

(Seal)

Henry Van Arsdale,
Acting Commissioner of Patents.